United States Patent
Ditzler et al.

(10) Patent No.: US 9,458,606 B2
(45) Date of Patent: Oct. 4, 2016

(54) BOOM APPARATUS WITH PROTECTIVE BARRIER FOR FLEXIBLE LINE

(71) Applicant: Deere & Company, Moline, IL (US)

(72) Inventors: Steven J. Ditzler, Bellevue, IA (US); Peter D. Zach, Ithica, NY (US); James F. O'Halloran, Hamilton (CA); Jonathan R. Hunt, Garnavillo, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/646,187

(22) PCT Filed: Jan. 31, 2013

(86) PCT No.: PCT/US2013/024146
§ 371 (c)(1),
(2) Date: Jul. 14, 2015

(87) PCT Pub. No.: WO2014/088609
PCT Pub. Date: Jun. 12, 2014

(65) Prior Publication Data
US 2015/0314458 A1  Nov. 5, 2015

Related U.S. Application Data

(63) Continuation of application No. 13/693,373, filed on Dec. 4, 2012, now Pat. No. 8,944,717.

(51) Int. Cl.
*E02F 9/00* (2006.01)
*E02F 9/22* (2006.01)
(Continued)

(52) U.S. Cl.
CPC ............. *E02F 9/2275* (2013.01); *B25J 17/00* (2013.01); *B25J 18/00* (2013.01); *E02F 9/006* (2013.01); *F01M 11/00* (2013.01); *F16C 11/045* (2013.01); *F16C 33/1085* (2013.01);
(Continued)

(58) Field of Classification Search
CPC ............................... E02F 9/006; E02F 9/2275
See application file for complete search history.

(56) References Cited

U.S. PATENT DOCUMENTS 3,295,699 A  1/1967  Bauernschub, Jr.
3,616,940 A  11/1971  Milner, Jr.
(Continued)

FOREIGN PATENT DOCUMENTS

IN  239227  9/2011

OTHER PUBLICATIONS

Images of Deere Boom (2 pages) (admitted as prior art before Sep. 20, 2011).
(Continued)

*Primary Examiner* — Gerald McClain (57) ABSTRACT

A boom apparatus comprises a boom structure, at least one flexible line, a fluid cylinder, and a barrier. The boom structure comprises a first boom and a second boom attached pivotally to the first boom. The at least one flexible line extends along the boom apparatus. The fluid cylinder is attached pivotally to the first boom and the second boom. The fluid cylinder comprises an end portion pinned to the second boom. The barrier is positioned between the end portion and the second boom. The at least one flexible line is routed externally of the second boom through a passageway positioned between the barrier and the second boom such that the barrier spaces the at least one flexible line apart from the end portion.

18 Claims, 8 Drawing Sheets

(51) Int. Cl.
*F01M 11/00* (2006.01)
*B25J 18/00* (2006.01)
*B25J 17/00* (2006.01)
*F16C 11/04* (2006.01)
*F16C 33/10* (2006.01)

(52) U.S. Cl.
CPC .... *Y10T 403/257* (2015.01); *Y10T 403/32885* (2015.01); *Y10T 403/32918* (2015.01); *Y10T 403/32951* (2015.01)

(56) References Cited

U.S. PATENT DOCUMENTS

| | | | | |
|---|---|---|---|---|
| T974,001 I4 * | 9/1978 | Neal | ............... | E02F 9/2275 414/697 |
| 4,260,064 A | 4/1981 | Ekstam | | |
| 4,267,674 A * | 5/1981 | Muller | ............... | E02F 9/2275 414/918 |
| 4,297,815 A * | 11/1981 | Moro | ............... | E02F 9/006 414/727 |
| 5,806,313 A * | 9/1998 | Koshi | ............... | E02F 9/2275 414/722 |
| 6,443,196 B1 | 9/2002 | Kurelek | | |
| 6,612,051 B2 | 9/2003 | Weyer et al. | | |
| 6,872,043 B2 * | 3/2005 | Yukawa | ............... | E02F 9/2275 414/694 |
| 7,008,169 B1 * | 3/2006 | Miyanishi | ............... | E02F 9/2275 414/685 |
| 7,070,383 B2 * | 7/2006 | Sugimoto | ............... | E02F 9/2275 414/694 |
| 8,505,570 B2 * | 8/2013 | Wimmer | ............... | E02F 9/2275 74/608 |
| 8,757,956 B2 * | 6/2014 | Thompson | ............... | E02F 9/2275 414/727 |
| 9,200,424 B2 * | 12/2015 | Ditzler | ............... | E02F 9/2275 |
| 2010/0158653 A1 * | 6/2010 | Webb | ............... | E02F 9/2275 414/722 |
| 2011/0002765 A1 * | 1/2011 | Asam | ............... | E02F 9/2275 414/722 |
| 2012/0241404 A1 | 9/2012 | Bobeck | | |
| 2013/0256468 A1 * | 10/2013 | Han | ............... | E02F 9/2275 248/56 |
| 2014/0133948 A1 * | 5/2014 | Hansen | ............... | E02F 9/006 414/722 |
| 2015/0336778 A1 * | 11/2015 | Ditzler | ............... | E02F 9/006 248/68.1 |

OTHER PUBLICATIONS

Background Information (1 page) (admitted as prior art before Sep. 20, 2011).
Report of Indian Design Patent No. 239227 (1 page)(Sep. 5, 2011).
International Seach Report and the Written Opinion of the International Seaching Authority, or the Declaration, PCT/US13/24155, dated Mar. 28, 2013 (10 pages).
Intenatonal Seach Report and the Written Opinon of the Intenatonal Seaching Authority, or the Declaration, PCT/US13/24413, dated Apr. 29, 2013 (11 pages).
Intenatonal Seach Report and the Written Opinon of the Internatonal Seaching Authority, or the Declaration PCT/US13/24146, dated May 3, 2013 (13 pages).

* cited by examiner

BOOM APPARATUS WITH PROTECTIVE BARRIER FOR FLEXIBLE LINE

FIELD OF THE DISCLOSURE

The present disclosure relates to a boom apparatus.

BACKGROUND OF THE DISCLOSURE

There are boom apparatus that have a boom structure, a number of flexible lines, and a hydraulic cylinder. The boom structure has a first boom and a second boom attached pivotally to the first boom. The hydraulic cylinder is attached pivotally to the first boom and two lugs of the second boom. The flexible lines are routed through a gap between the second boom and an eye of the rod end portion of the hydraulic cylinder, and are vulnerable to rubbing against, and being abraded by, the eye during pivotal movement of the second boom relative to the first boom.

SUMMARY OF THE DISCLOSURE

According to an aspect of the present disclosure, a boom apparatus comprises a boom structure, at least one flexible line, a fluid cylinder, and a barrier. The boom structure comprises a first boom and a second boom attached pivotally to the first boom. The second boom has a first, longitudinal dimension, a second, lateral dimension, and a third dimension. The first, second, and third dimensions are perpendicular to one another. The at least one flexible line extends along the boom apparatus relative to the first dimension. The fluid cylinder is attached pivotally to the first boom and the second boom to pivot the second boom relative to the first boom. The fluid cylinder comprises an end portion pinned to the second boom. The barrier is positioned between the end portion and the second boom relative to the third dimension. The at least one flexible line is routed externally of the second boom through a passageway positioned between the barrier and the second boom relative to the third dimension such that the barrier spaces the at least one flexible line apart from the end portion so as to prevent abrasion of the at least one flexible line by the end portion during pivotal movement of the second boom relative to the first boom.

The above and other features will become apparent from the following description and the attached drawings.

BRIEF DESCRIPTION OF THE DRAWINGS

The detailed description of the drawing refers to the accompanying figures in which.

DETAILED DESCRIPTION OF THE DRAWINGS

Figure 1:
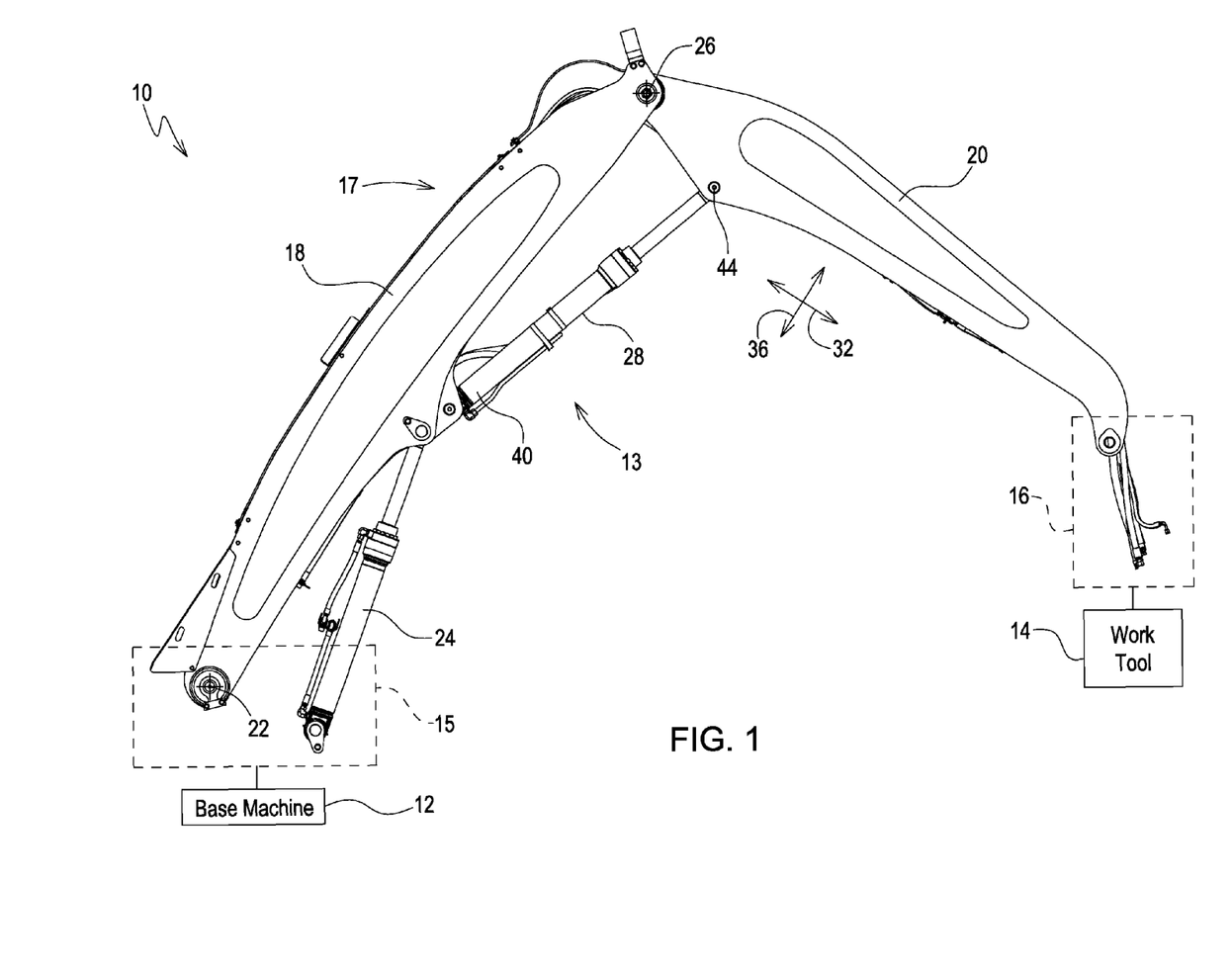
FIG. 1 is right-hand side elevation view showing a work machine comprising a base machine (shown diagrammatically), a boom apparatus attached to the base machine, and a work tool (shown diagrammatically) attached to the boom apparatus.

Referring to FIG. 1, a work machine 10 comprises, for example, a base machine 12, a boom apparatus 13, and a work tool 14. The work machine 10 may be any of a variety of work machines. For example, the work machine 10 may be a forestry machine. In such a case, the base machine 12 may be a tracked or wheeled base machine, and the work tool 14 may be a forestry attachment, such as, for example, a disk saw felling head, a harvesting head, or a debarking head, to name but a few forestry attachments. The boom apparatus 13 is illustrated, for example, as a boom apparatus for a forestry machine, it being understood that the boom apparatus 13 may be configured for a wide variety of work machines.

The boom apparatus 13 comprises, for example, a first end portion 15 and a second end portion 16. The first end portion 15 is attached to the base machine 12, and the work tool 14 is attached to the second end portion 16.

The boom apparatus 13 comprises, for example, a boom structure 17. Exemplarily, the boom structure 17 comprises a first boom 18 and a second boom 20. The first boom 18 is attached pivotally to the base machine 12 for pivotal movement of the first boom 18, and thus the boom structure 17, relative to the base machine 12 about a first boom pivot axis 22. The second boom 20 is attached pivotally to the first boom 18 for pivotal movement of the second boom 20 relative to the first boom 18 about a second boom pivot axis 26.

The boom apparatus 13 comprises, for example, two fluid cylinders 24 (e.g., hydraulic cylinders). The cylinders 24 are attached pivotally to the base machine 12 and the first boom 18 to raise and lower the first boom 18, and thus the boom structure 17, relative to the base machine 12 about the first boom pivot axis 22.

The boom apparatus 13 comprises, for example, a fluid cylinder 28, in the form of, for example, a hydraulic cylinder. The cylinder 28 is attached pivotally to the first boom 18 and the second boom 20 to pivot the second boom 20 relative to the first boom 18. The cylinder 28 is so attached to pivot the second boom 20 relative to the first boom 18 about the second boom pivot axis 26.

Referring to FIGS. 2-5, the second boom 20 has a first, longitudinal dimension 32, a second, lateral dimension 34, and a third dimension 36. The first, second, and third dimensions 32, 34, 36 are perpendicular to one another.

The boom apparatus 13 comprises, for example, a monolithic (one-piece) anchor body 30. The anchor body 30 is fixed (e.g., welded) to the second boom 20. The anchor body 30 comprises, for example, a hinge point 38. The cylinder 28 comprises, for example, a first end portion 40 attached pivotally to the first boom 18 and a second end portion 42 (e.g., eye of rod end portion) attached pivotally to the anchor body 30 and thus the second boom 20. The second an end portion 42 is pinned to the second boom 20. The hinge point 38 and the second end portion 42 are included in a hinge 44 of the boom apparatus 13 so as to be pinned to one another.

The anchor body 30 comprises, for example, a barrier 46 positioned between the second end portion 42 and the second boom 20 relative to the third dimension 36. The boom apparatus 13 comprises, for example, at least one flexible line 48 routed externally of the second boom 20 through a passageway 50 positioned between the barrier 46 and the second boom 20 relative to the third dimension 36 such that the barrier 46 spaces the at least one flexible line 48 apart from the second end portion 42 (FIG. 5) so as to prevent abrasion of the at least one flexible line 48 by the second end portion 42 during pivotal movement of the second boom 20 relative to the first boom 18 about the second boom pivot axis 26.

Illustratively, the anchor body 30 is a monolithic structure. For example, the anchor body 30 is a casting made, for example, of cast steel. In other examples, it may be a weldment, or have its components otherwise attached to one another.

The anchor body 30 comprises, for example, a frame 52. The frame 52 is fixed (e.g., welded) to the second boom 20, such that the frame 52 mates with the second boom 20. The hinge point 38 and the barrier 46 are mounted to the frame 52. The frame 52 and the barrier 46 cooperate to define the passageway 50.

Figure 6:
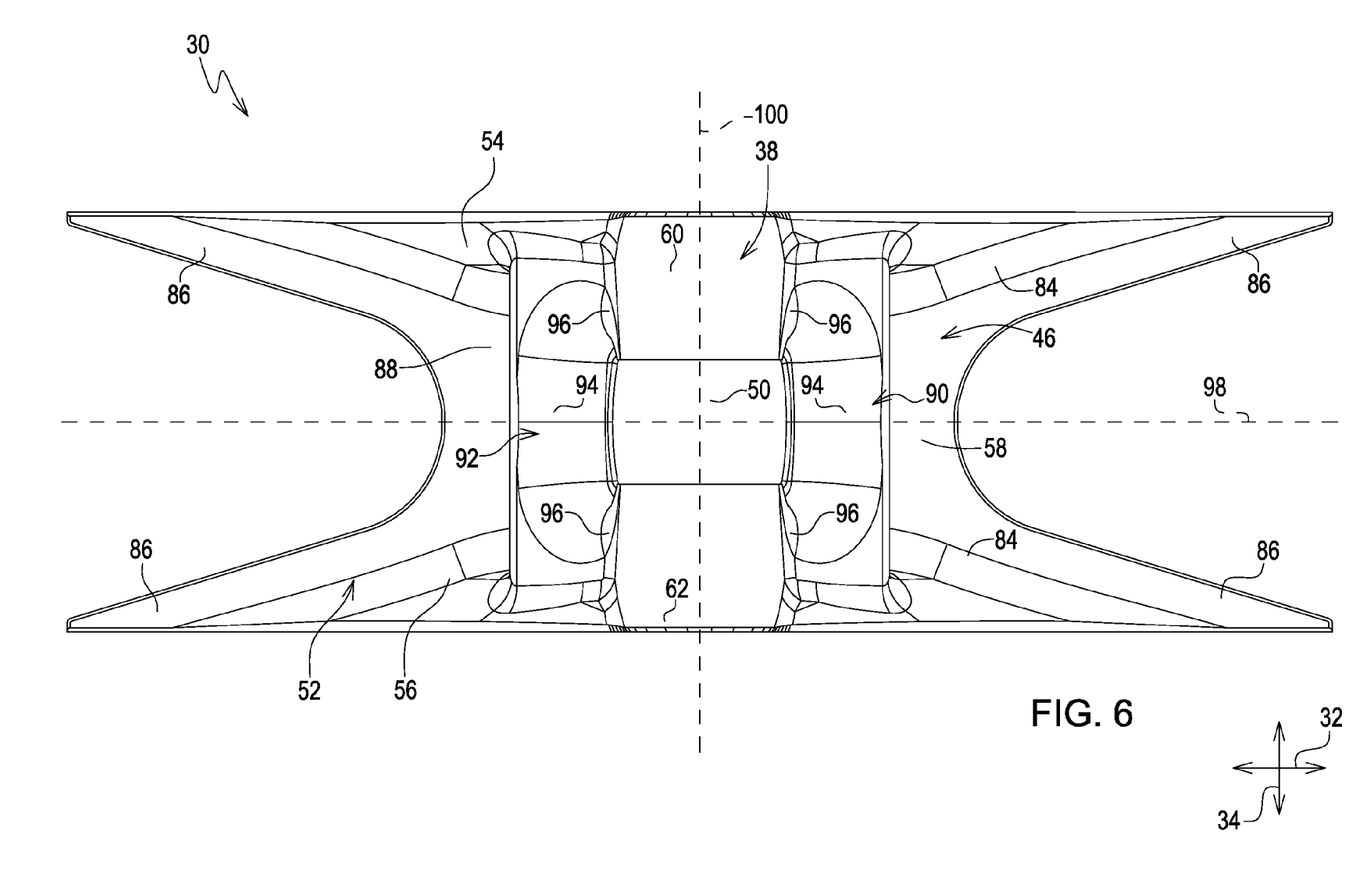
FIG. 6 is a bottom view showing the anchor body.
Figure 7:
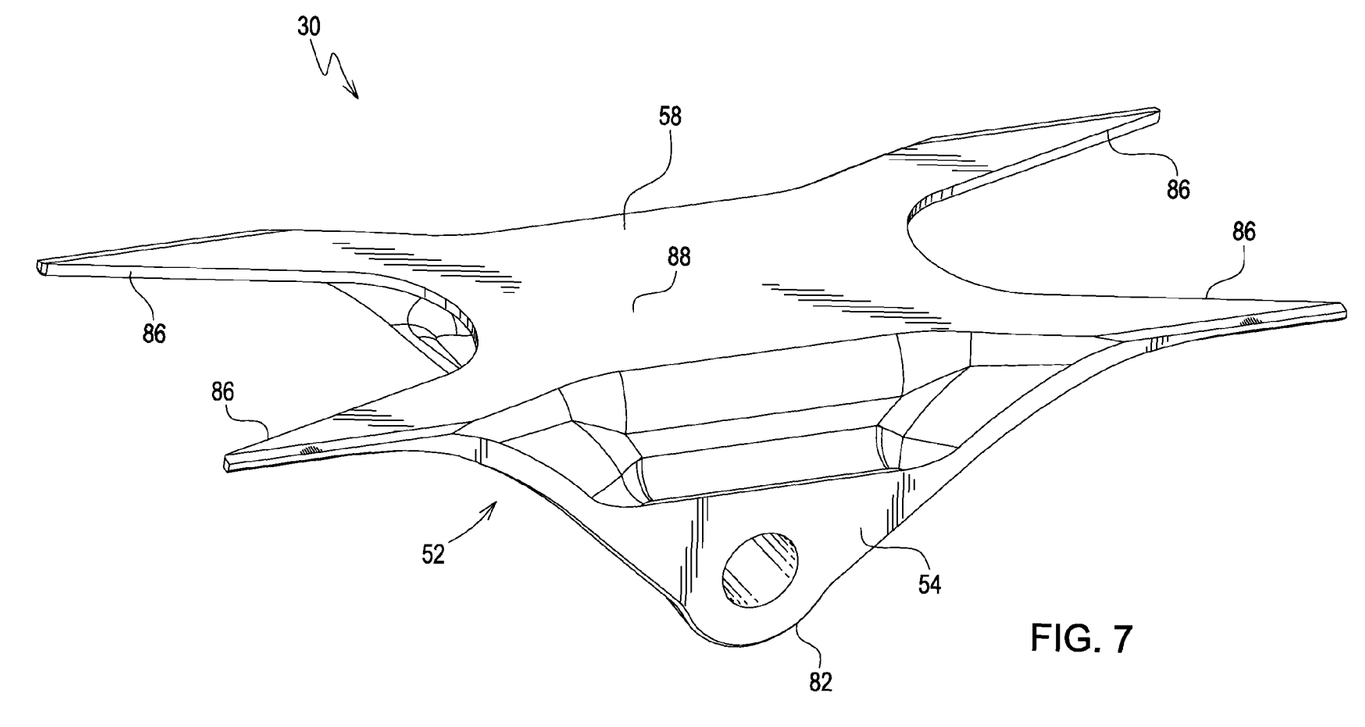
FIG. 7 is a perspective view of the anchor body.
Figure 8:
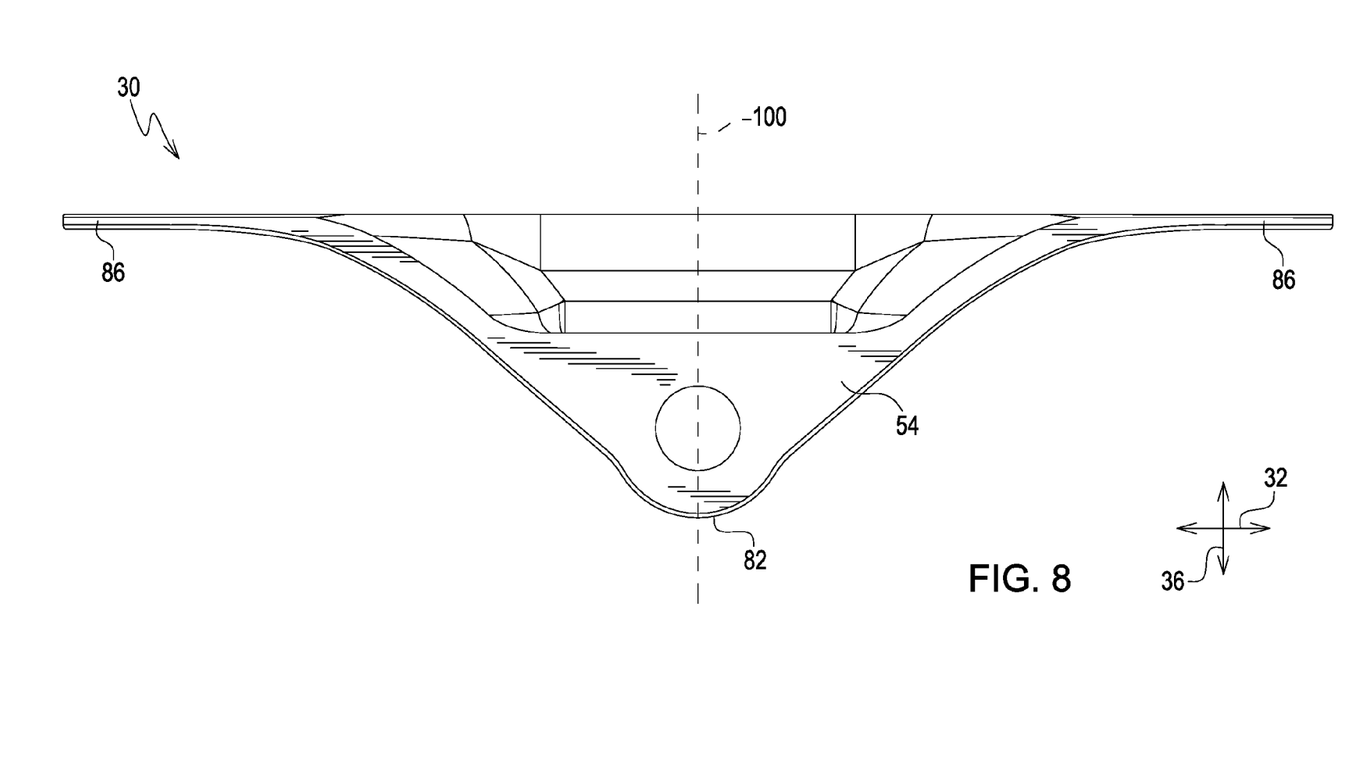
FIG. 8 is a right-hand side elevation view of the anchor body.

Referring to FIGS. 6-8, the frame 52 comprises a first frame side wall 54, a second frame side wall 56 spaced apart from the first frame side wall 54 relative to the second dimension 34, and a support wall 58 attached to the first and second frame side walls 54, 56 (e.g., integrated with the walls 54, 56 in a casting). The hinge point 38 and the barrier 46 are mounted to the first and second frame side walls 54, 56 (e.g., integrated with the walls 54, 56 in a casting).

Figure 2:
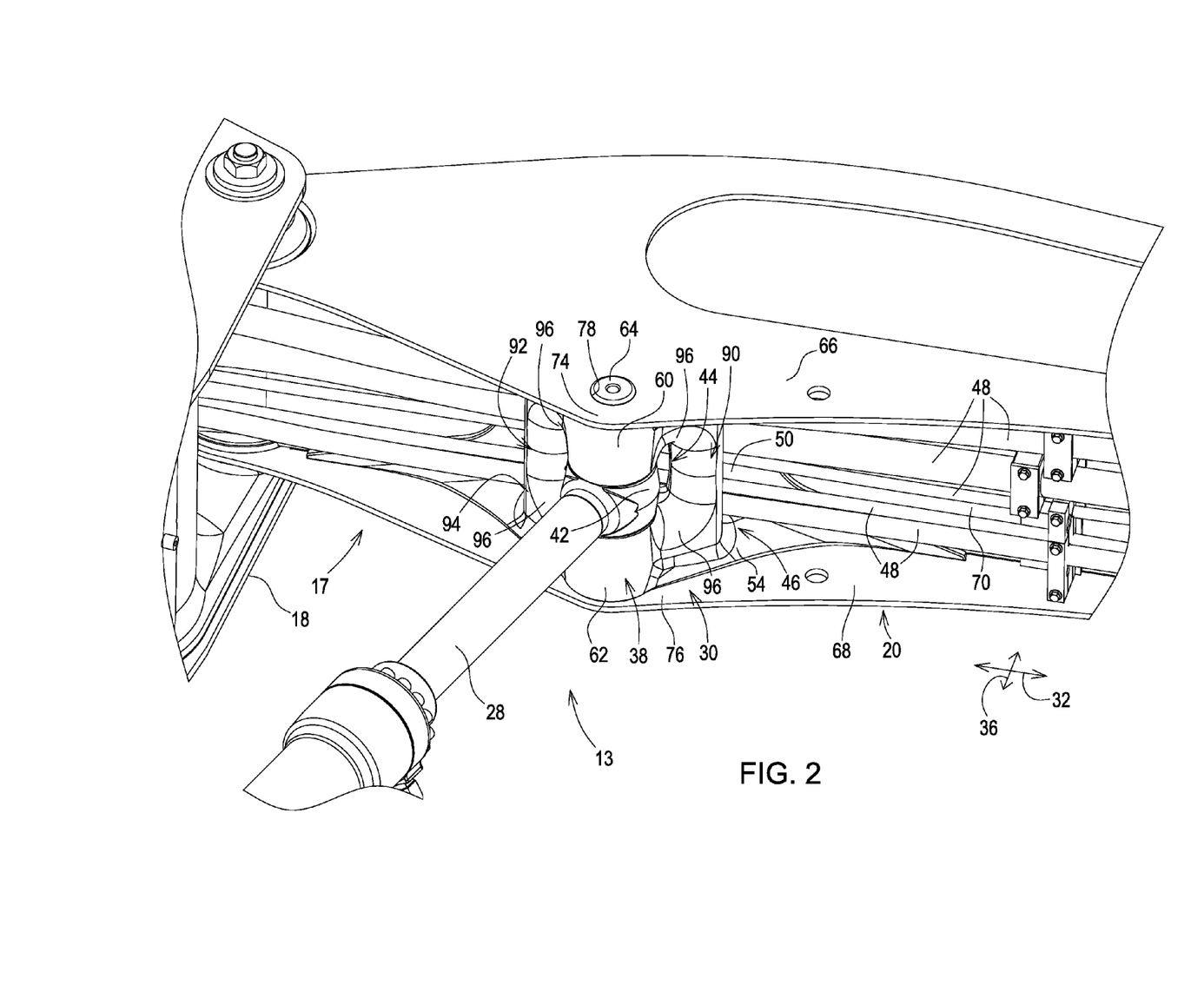
FIG. 2 is a perspective view showing an anchor body fixed to a second of two booms of a boom structure of the boom apparatus.
Figure 3:
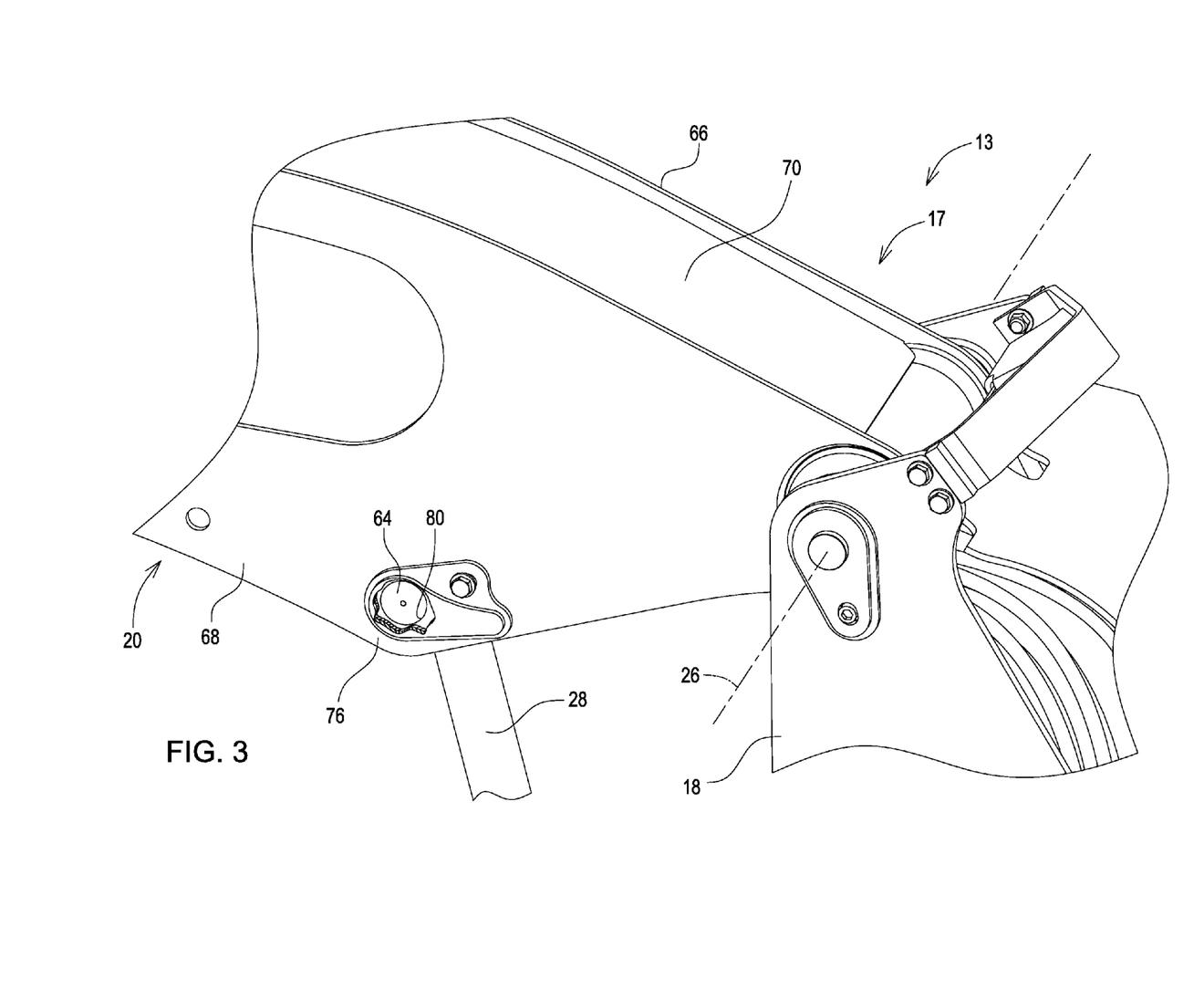
FIG. 3 is a perspective view showing a left-hand side of the second boom.
Figure 4:
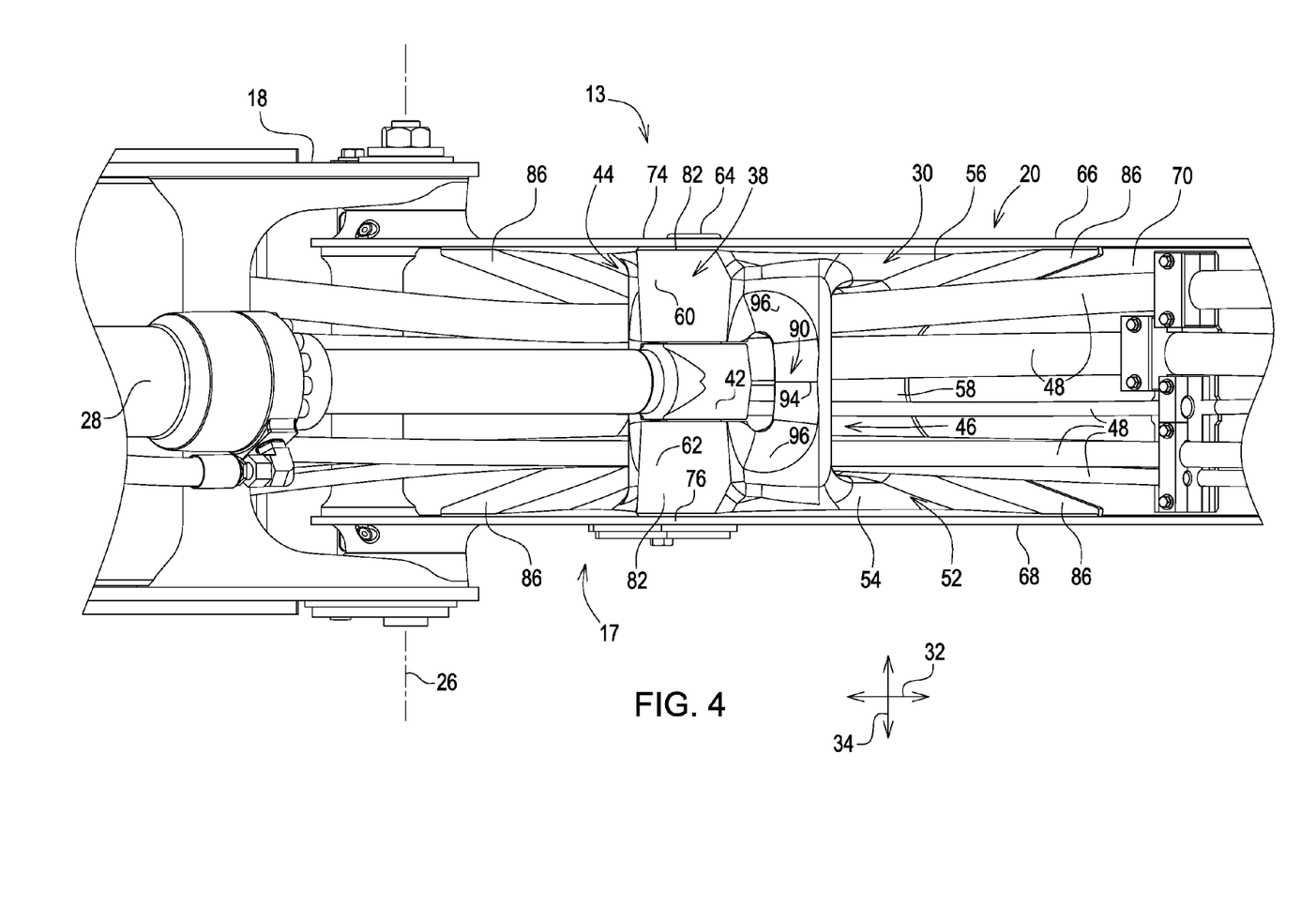
FIG. 4 is a bottom view showing the anchor body fixed to the second boom.

Referring to FIGS. 2-4, the second boom 20 comprises, for example, a first boom side wall 66, a second boom side wall 68, a first intermediate boom wall 70 (e.g., bottom boom wall), and a second intermediate boom wall 72 (e.g., top boom wall). The first and second boom intermediate boom walls 70, 72 are spaced apart from one another relative to the third dimension 36 and are attached to (e.g., welded) and positioned between and the first and second boom side walls 66, 68 relative to the second dimension 34. The second boom side wall 68 is spaced apart from the first boom side wall 68 relative to the second dimension 34 by use of the first and second boom intermediate boom walls 70, 72. The second boom 20 is thus configured, for example, as a box boom. The first boom 18 is also configured, for example, as a box boom.

Figure 5:
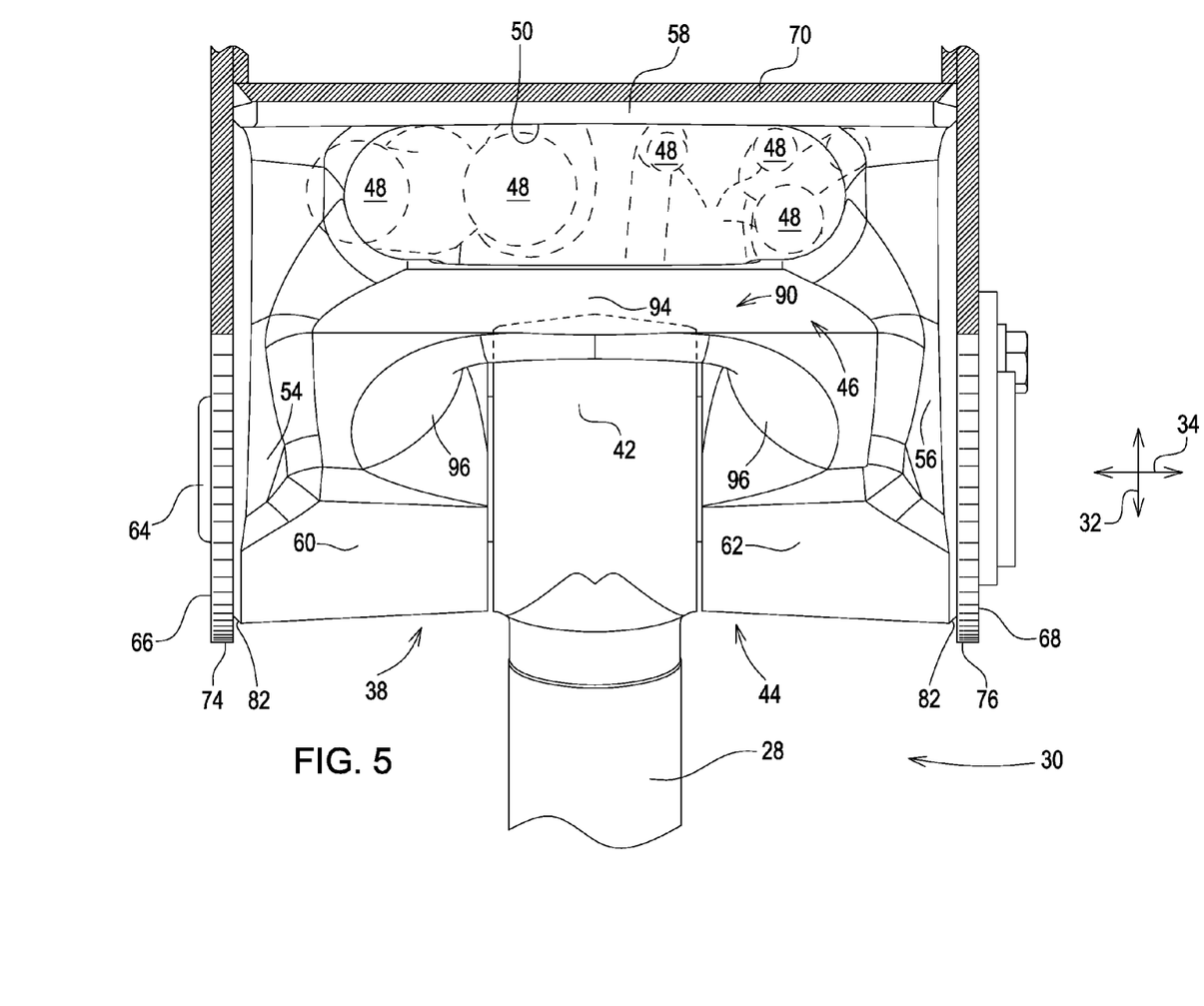
FIG. 5 is a sectional view taken along lines 5-5 showing at least one flexible line spaced apart from an end portion of a fluid cylinder by a barrier.

Referring to FIGS. 2, 4, and 5, the second boom 20 comprises, for example, a first lug 74 and a second lug 76. Exemplarily, the first boom side wall 66 comprises the first lug 74, and the second boom side wall 68 comprises the second lug 76. The first frame side wall 54 is mounted (e.g., welded) to the first lug 74. The second frame side wall 56 is mounted (e.g., welded) to the second lug 76.

Referring to FIGS. 2 and 4-6, the hinge point 38 comprises, for example, a first barrel 60 and a second barrel 62. The second end portion 42 is positioned between the first and second barrels 60, 62 relative to the second dimension 34. Exemplarily, the hinge 44 comprises a pin 64.

The hinge point 38 is mounted to the first and second frame side walls 54, 56. The first and second barrels 60, 62 are mounted respectively to the first and second frame side walls 54, 56 (e.g., integrated with the walls 54, 56 in a casting). The first and second barrels 60, 62 and the end portion 42 are positioned between the first and second lugs 74, 76 relative to the second dimension 34, such that the pin 64 is positioned in the first and second barrels 60, 62, the end portion 42, a hole 78 of the first lug 74, and a hole 80 of the second lug 76. The pin 64 is flagged to the second frame side wall 56 against movement relative thereto.

Referring to FIGS. 6-8, each of the first frame side wall 54 and the second frame side wall 56 is generally triangle-shaped. The first barrel 60 provides a vertex 82 of the first frame side wall 54. The second barrel 62 provides a vertex 82 of the second frame side wall 56. The support wall 58 is mounted (e.g., welded) to the first intermediate boom wall 70, and attached to a first edge 84 of the first frame side wall 54 opposite to the vertex 82 of the first frame side wall 54 and to a second edge 84 of the second frame side wall 56 opposite to the vertex 82 of the second frame side wall 56.

The anchor body 30 is symmetrical. It is symmetrical relative to a first plane of symmetry 98 and a second plane of symmetry 100. Each of the hinge point 38, the barrier 46, and the frame 52 is symmetrical relative to the planes of symmetry 98, 100.

Referring to FIGS. 4-6, the support wall 58 is mounted (e.g., welded) to the first intermediate boom wall 70. The support wall 58 is, for example, H-shaped. In such a case, the support wall 58 comprises, for example, four legs 86 and a bridge 88 interconnecting the four legs 86. The four legs 86 are positioned on the first intermediate boom wall 70. Two of the legs 86 extend along the corner between the first frame side wall 54 and the first intermediate boom wall 70 so as to be mounted (e.g., welded) to the walls 54, 70, and two of the legs 86 extend along the corner between the second frame side wall 56 and the first intermediate boom wall 70 so as to be mounted (e.g., welded) to the walls 56, 70. The bridge 88 is mounted (e.g., welded) to the first intermediate boom wall 70.

Referring to FIG. 6, the barrier 46 is mounted to the first and second frame side walls 54, 56. The barrier 46 comprises, for example, a first barrier portion 90 and a second barrier portion 92. The first and second barrier portions 90, 92 are mounted respectively to the first and second frame side walls 54, 56 (e.g., integrated with the walls 54, 56 in a casting).

The hinge point 38 is positioned, for example, between the first and second barrier portions 90, 92 relative to the first dimension 32. The first and second barrels 60, 62 are positioned between the first and barrier portions 90, 92 relative to the first dimension 32.

The barrier 46 is positioned, for example, between the support wall 58 and the hinge point 38 relative to the third dimension 36. The first and second barrier portions 90, 92 are positioned between the support wall 58 and the first and second barrels 60, 62 relative to the third dimension 36.

Each of the first and second barrier portions 90, 92 is, for example, generally C-shaped. Each of the first and second barrier portions 90, 92 comprises, for example, a post 94 extending lengthwise in the second dimension 34, a first arm 96 extending from the post 94 and attached to the first frame side wall 54 and the first barrel 60 (e.g., integrated with the wall 54 and barrel 60), and a second arm 96 extending from the post 94 and attached to the second frame side wall 56 and the second barrel 62 (e.g., integrated with the wall 56 and barrel 62).

The first and second frame side walls 54, 56, the support wall 58, and the barrier 46 cooperate, for example, to define the passageway 50. The bridge 88 and the first and second barrier portions 90, 92 define portions of the passageway 50.

Referring to FIG. 5, at least one flexible line 48 is routed through the passageway 50. Exemplarily, there are a number of flexible lines 48 routed through the passageway 50. Each flexible line 48 may be, for example, a hydraulic line, an electrical line, or a grease line. One or more of the lines may be for an attachment (e.g., forestry attachment) to an end of the boom structure 17.

The barrier 46 spaces the flexible lines 48 apart from the hinge 44 so as to prevent abrasion of the lines 48 during pivotal movement of the second boom 20 relative to the first boom 18. The barrier 46 spaces the flexible lines 48 apart from the end portion 42 so as to prevent abrasion of the flexible lines 48 by the end portion 42 during such pivotal movement. The barrier 46 prevents sagging or flexing of the lines 48 into the hinge 44. The anchor body 30 promotes compactness of the envelope of the boom apparatus 13 and simplicity and tidiness in routing of the lines 48.

U.S. patent application Ser. No. 13/236,935, filed 20 Sep. 2011, and U.S. patent application Ser. No. 13/693,373, filed 4 Dec. 2012, are hereby incorporated by reference herein.

Welds and any threads have not been shown in the drawings for simplification of illustration, it being understood that it would be well within the skill of one of ordinary skill in the art to provide those features without undue experimentation.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the appended claims.

What is claimed is:

1. A boom apparatus, comprising:
   a boom structure comprising a first boom and a second boom attached pivotally to the first boom, the second boom having a first, longitudinal dimension, a second, lateral dimension, and a third dimension, the first, second, and third dimensions perpendicular to one another,
   at least one flexible line extending along the boom apparatus relative to the first dimension,
   a fluid cylinder attached pivotally to the first boom and the second boom to pivot the second boom relative to the first boom, the fluid cylinder comprising an end portion pinned to the second boom,
   a barrier positioned between the end portion and the second boom relative to the third dimension, the at least one flexible line routed externally of the second boom through a passageway positioned between the barrier and the second boom relative to the third dimension such that the barrier spaces the at least one flexible line apart from the end portion so as to prevent abrasion of the at least one flexible line by the end portion during pivotal movement of the second boom relative to the first boom,
   a monolithic anchor body fixed to the second boom, the anchor body comprises:
      a hinge point, the hinge point and the end portion are included in a hinge of the boom apparatus so as to be pinned to one another, and
      the barrier.

2. The boom apparatus of claim 1, wherein the anchor body is a casting.

3. The boom apparatus of claim 1, wherein the hinge point comprises a first barrel and a second barrel, the end portion is positioned between the first barrel and the second barrel relative to the second dimension, and the hinge comprises a pin positioned in the first barrel, the second barrel, and the end portion.

4. The boom apparatus of claim 3, wherein the second boom comprises a first lug and a second lug, the first and second barrels and the end portion are positioned between the first and second lugs relative to the second dimension, and the pin is positioned in a hole of the first lug and a hole of the second lug.

5. The boom apparatus of claim 1, wherein the barrier is positioned between the hinge point and the second boom relative to the third dimension.

6. The boom apparatus of claim 5, wherein the barrier comprises a first barrier portion and a second barrier portion, and the hinge point is positioned between the first and second barrier portions relative to the first dimension.

7. The boom apparatus of claim 1, wherein the anchor body comprises a frame, the hinge point and the barrier are mounted to the frame, and the frame is fixed to the second boom.

8. The boom apparatus of claim 7, wherein the frame mates with the second boom.

9. The boom apparatus of claim 7, wherein the second boom comprises a first boom side wall and a second boom side wall spaced apart from the first boom side wall relative to the second dimension, the frame comprises a first frame side wall and a second side frame wall spaced apart from the first frame side wall relative to the second dimension, the first boom side wall comprises a first lug, the second boom side wall comprises a second lug, the first frame side wall is mounted to the first lug, the second frame side wall is mounted to the second lug, and the hinge point and the barrier are mounted to the first and second frame side walls.

10. The boom apparatus of claim 9, wherein the hinge point comprises a first barrel and a second barrel, the hinge comprises a pin positioned in the first barrel, the second barrel, and the end portion positioned between the first barrel and the second barrel relative to the second dimension, the first barrel is mounted to the first frame side wall, and the second barrel is mounted to the second frame side wall.

11. The boom apparatus of claim 10, wherein each of the first frame side wall and the second frame side wall is generally triangle-shaped, the first barrel provides a vertex of the first frame side wall, and the second barrel provides a vertex of the second frame side wall.

12. The boom apparatus of claim 11, wherein the second boom comprises an intermediate boom wall attached to and positioned between the first boom side wall and the second boom side wall relative to the second dimension, the frame comprises a support wall mounted to the intermediate boom wall and attached to a first edge of the first frame side wall opposite to the vertex of the first frame side wall and to a second edge of the second frame side wall opposite to the vertex of the second frame side wall.

13. The boom apparatus of claim 12, wherein the support wall is H-shaped.

14. The boom apparatus of claim 10, wherein the barrier comprises a generally C-shaped first barrier portion and a generally C-shaped second barrier portion, the first and second barrels are positioned between the first and second barrier portions relative to the first dimension, and each of the first and second barrier portions comprises a post extending lengthwise in the second dimension, a first arm extending from the post and attached to the first frame side wall and the first barrel, and a second arm extending from the post and attached to the second frame side wall and the second barrel.

15. The boom apparatus of claim 14, wherein the hinge point comprises a first barrel and a second barrel between which the end portion is positioned relative to the second dimension, the hinge comprises a pin positioned in the first and second barrels and the end portion, the barrier comprises a first barrier portion and a second barrier portion, the first and second barrels are positioned between the first and barrier portions relative to the first dimension, and the first and second barrier portions are positioned between the support wall and the first and second barrels relative to the third dimension.

16. The boom apparatus of claim 9, wherein the second boom comprises an intermediate boom wall attached to and positioned between the first boom side wall and the second boom side wall relative to the second dimension, the frame comprises a support wall mounted to the intermediate boom wall and attached to the first frame side wall and the second frame side wall, and the first and second frame side walls, the support wall, and the barrier cooperate to define the passageway.

17. The boom apparatus of claim 7, wherein the frame comprises a first frame side wall, a second frame side wall, and a support wall attached to the first and second frame side walls, the hinge point and the barrier are mounted to the first and second frame side walls, and the barrier is positioned between the support wall and the hinge point relative to the third dimension.

18. The boom apparatus of claim 7, wherein the frame and the barrier cooperate to define the passageway.

* * * * *